6939X
S. Costell,
Oscillating Steam Engine.
Patented Feb. 20, 1832.
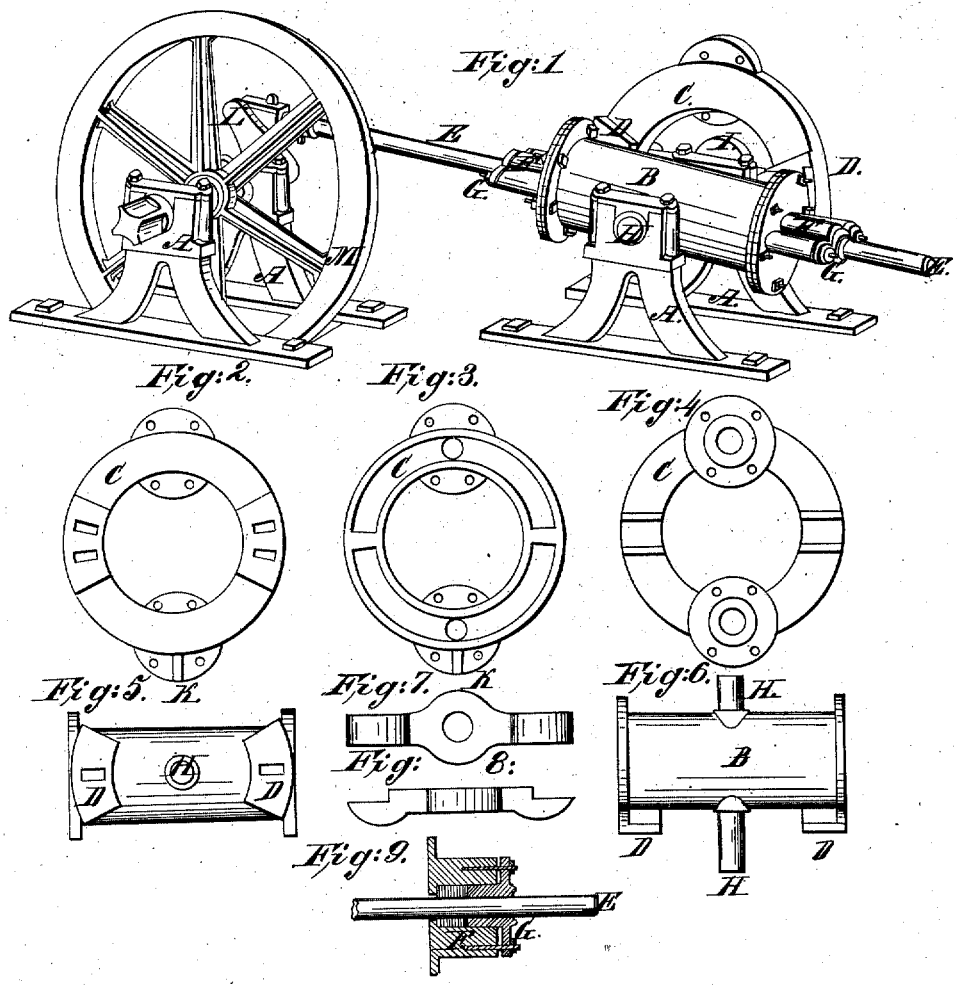
N. PETERS, PHOTO-LITHOGRAPHER, WASHINGTON, D. C.

[illegible]

6939X

Feb. 20. 1832

Stacy Costill of

Letters Patent

The Schedule referred to in these Letters Patent and making part of the same containing a description in the words of the said Stacy Costill himself of his improvement in the method of constructing a steam or power engine An improvement in, and simplified method of constructing a Steam or Power Engine The improvement is in the operative part of the Engine, and in the great simplicity of arrangement.

The cylinder vibrates on shafts or Trunnions attached on or belonging to it - The piston rod passes through both ends of the cylinder one end of which rod is attached to the crank - The piston rod is made sufficiently large not to give way by the power required to vibrate the Cylinder and to overcome the friction of the Valve in addition to its customary office The Valve that applies the Steam to the Cylinder does not move - It is a trunk or Pipe circular or other form - The hollow part or cavity passes nearly round leaving stops opposite to the openings of the Cylinder when the Piston rod is fully extended or the Crank on the centre or dead point. The openings of the Valve are by the side of these Stops: so that when the crank passes the centre, it brings one opening of the Valve and the opening of the Cylinder in contact: so as to admit the steam to apply its power to the piston, while at the same time the Cylinder is discharging the exhaust Steam into one of the openings of the Valve at the opposite end of the Cylinder.

The Valve has four openings two of which are at each end of the Cylinder - The Valve is attached by a bar to the shaft or Trunnion of the Cylinder and is secured by a screw or other mechanical power to hold it up to the ends of the Cylinder against the pressure of the Steam thus doing away with the use of the Steam chest.

[illegible]

150 6939x Feb 20, 1832 connecting rods and slides &c.

That which is claimed as new in this method of constructing an engine is, the feature of holding up the valve to the Cylinder by mechanical power. ——— The valve being stationary, the disuse of the Steam chest, and consequent simplicity of the whole arrangement =

This specification is further illustrated by the drawing which is annexed to it.

Witnesses
Robt. S. Bickley
John Burson

Stacy Costill

Exd. [illegible]

[illegible]